United States Patent Office 3,481,922
Patented Dec. 2, 1969

3,481,922
6-(α - 3 - ACYLTHIOUREIDOPHENYLACETAMIDO)-
AND 6 - (α-3-ACYLTHIOUREIDOTHIENYLACET-
AMIDO)-PENICILLANIC ACIDS
Charles Truman Holdrege, Camillus, N.Y., assignor to
Bristol-Myers Company, New York, N.Y., a corporation of Delaware
No Drawing. Filed June 13, 1968, Ser. No. 736,574
The portion of the term of the patent subsequent
to Nov. 18, 1986, has been disclaimed
Int. Cl. C07d 99/16
U.S. Cl. 260—239.1      31 Claims

ABSTRACT OF THE DISCLOSURE 6-(α-3 - acylthioureidophenylacetamido)- and 6-(α-3-acylthioureidothienylacetamido)-penicillanic acids are valuable as antibacterial agents, nutritional supplements in animal feeds, therapeutic agents in poultry and animals, including man, and are especially useful in the treatment of infectious diseases caused by Gram-positive and Gram-Negative bacteria, most particularly those caused by the Pseudomonas genus. 6-{D-α-[3-(2'-furoyl)thioureido]-phenylacetamido}-penicillanic acid, a preferred embodiment of the invention, is prepared by the treatment of 6-(D-α-amino-phenylacetamido)-penicillanic acid (ampicillin) with 2-furoyl isothiocyanate.

BACKGROUND OF THE INVENTION

Field of the invention

The penicillins of the present invention possess the usual attributes of such compounds and are particularly useful in the treatment of Pseudomonas infections.

Description of the prior art

Heretofore very few penicillins have been found to possess any significant activity against Pseudomonas. The compounds of the present invention exhibit this desirable activity at significantly low concentrations.

α-Aminobenzylpenicillins and α-aminothenylpenicillins are known, as from U.S. Patents 2,985,648, 3,140,282, 3,373,156, 3,308,023 and 3,342,677 and British Patents 903,785, 918,169, 978,178, 991,586 and 1,033,257 and for such compounds bearing substituents on the α-amino group from such British patents as 891,777, 894,457, 1,053,818, 1,051,675, 1,048,907, 1,064,893, 1,066,107 and 1,080,247 and from South Africa 67/2,092. N-substituted 6-ureidopenicillanic acids have been disclosed, for example, in U.S. Patents 3,118,877, 3,120,512 and 3,180,863 and in Belgian Patent 603,703 and German Patent 1,120,072; 6-ureidopenicillanic acid itself is disclosed in German Patents 1,141,640 and 1,120,072 and French Patent 1,324,918. A few substituted α-ureidomethylpenicillins are disclosed in U.S. Patent 3,352,851 and British Patent 1,040,166; none have a substituent in the 3-position of the ureido group. British Patent 1,061,335 discloses 6 - (D - α - hydrazinocarbonylamino - α-phenylacetamido)penicillanic acid and 6-(D-α-benzyloxycarbonylhydrazocarbonylamino-α - phenylacetamido)penicillanic acid and, in general, other so-called acyl groups in place of the benzyloxycarbonyl group.

SUMMARY OF THE INVENTION

Compounds having the formula

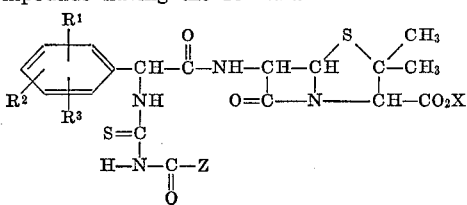

or

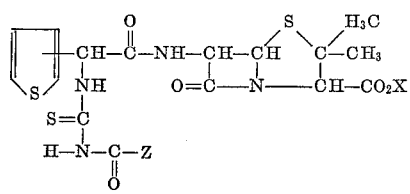

wherein $R^1$, $R^2$ and $R^3$ each is hydrogen, nitro, (lower)alkylamino, di(lower)alkylamino, (lower)alkanoylamino, amino, hydroxy, (lower)(alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl 2 to 6 carbon atoms,

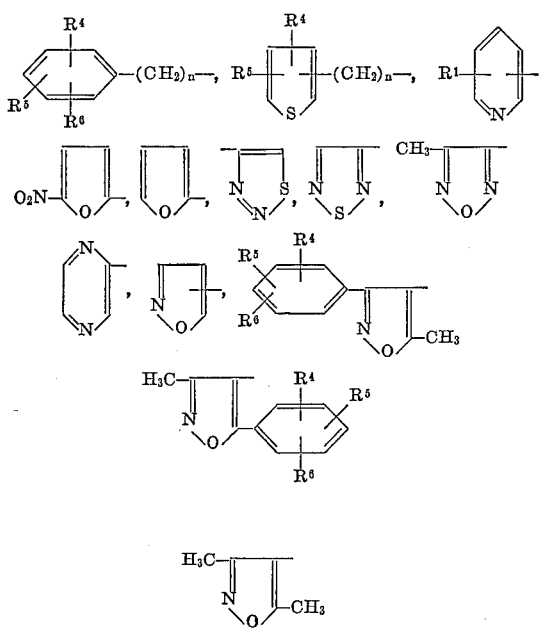

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)-alkyl (comprising straight and branched chain saturated aliphatic groups having from 1 to 6 carbon atoms inclusive), (lower)alkoxy, sulfamyl, chloro, iodo, bromo, fluoro or trifluoromethyl; X is hydrogen or a nontoxic, pharmaceutically acceptable metallic cation such as sodium, potassium, calcium, aluminum, and the like, the ammonium cation and substituted ammonium cations, e.g., cations of such nontoxic amines at tri-(lower)algylamines, i.e., triethylamine, etc., procaine, dibenzylamine, N-benzyl-beta-phenethylamine, 1-ephenamine, N,N'-dibenzylethylenediamine, dehydroabietylamine, N,N'-bis-dehydroabietylethylenediamine, N - (lower)alkylpiperidine, e.g., N-ethylpiperidine, or other such amines which have been used to form pharmaceutically acceptable nontoxic salts with benzylpenicillin, are prepared by the treatment of the corresponding α-amino compound with an acyl isothiocyanate.

In a preferred embodiment of this invention, $R^1$, $R^2$, $R^3$ and, if present, $R^4$, $R^5$ and $R^6$ are each hydrogen, Z is one of the specified aromatic radicals and most preferably Z is phenyl, 2- or 3-thienyl, 2-furyl or 5-nitro-2-furyl and the α-carbon of the penicillin side chain (to which the acylthioureido group is attached) is of the D(-) configuration.

DETAILED DESCRIPTION

Antibacterial agents such as ampicillin (U.S. 2,985,648) have proved highly effective in the past in the therapy of infections due to Gram-positive and Gram-negative bacteria but these compounds have been notably lacking in their ability to effectively control Pseudomonas infections. Carbenicillin (U.S. 3,142,673 and 3,282,926) is active against Pseudomonas only in high concentrations and is useful in such infections in man only when given by injection.

It was an object of the present invention to provide compounds useful in the treatment of infections caused by Gram-positive and Gram-negative bacteria, including particularly those caused by *Pseudomonas aeruginosa*.

The compounds of the present invention as defined above under "Summary of the Invention" are particularly useful in that they possess antibacterial activity against both Gram-positive and Gram-negative bacteria, and most particularly exhibit activity against *Pseudomonas aeruginosa* infections.

The α-carbon atom of the penicillin side chain (to which the acylthioureido group is attached) is an asymmetric carbon atom and the compounds of this invention can therefore exist in two optically active isomeric forms [the D- and L-diastereoisomers], as well as in the DL form which is a mixture of the two optically active forms; all such isomeric forms of the compounds are included within the scope of the present invention but the D(-) form is preferred. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

The compounds of the present invention are prepared by the process comprising the consecutive steps of:

(A) Mixing a compound having the formula

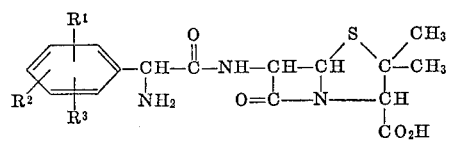

or

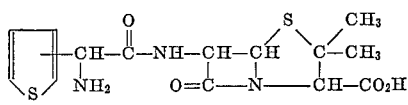

or a mono- or polyhydrate or salt thereof, wherein $R^1$, $R^2$ and $R^3$ each is hydrogen, nitro, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; with an acyl isothiocyanate having the formula

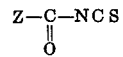

wherein Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms,

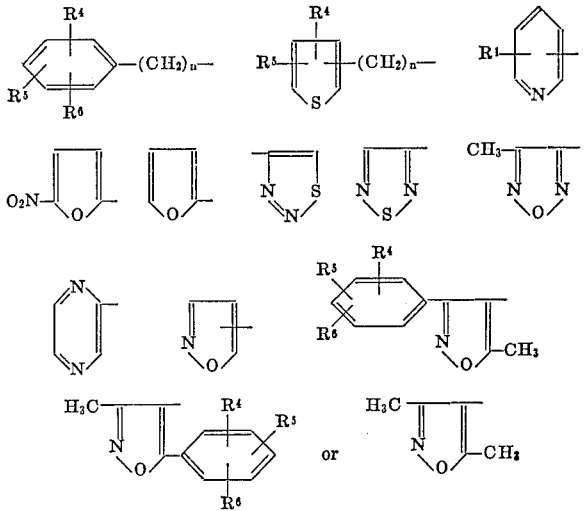

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl, preferably in a ratio of 1.0 to 1.5 equivalents of the acyl isothiocyanate per equivalent of the penicillin acid, in the presence of a base, preferably an organic base such as a pyridine, N-methylpiperidine, tri(lower)alkylamine, or the like, but preferably in the presence of pyridine or triethylamine, preferably in a ratio of one to two moles of amine per mole of the penicillin acid, in an anhydrous inert solvent such as dimethylformamide, dimethylsulfoxide, chloroform, tetrahydrofuran, n-pentane, methylene chloride, but preferably methylene chloride, at a temperature in the range of about −20° C. to 50° C., but preferably about 0° C. to 20° C., for a period of time of at least thirty minutes, with agitation to produce a compound having the formula

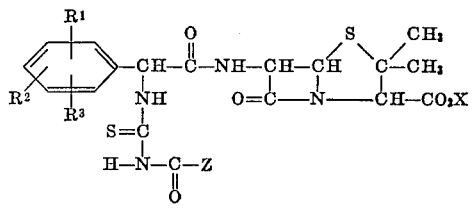

and

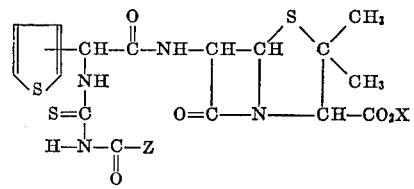

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms,

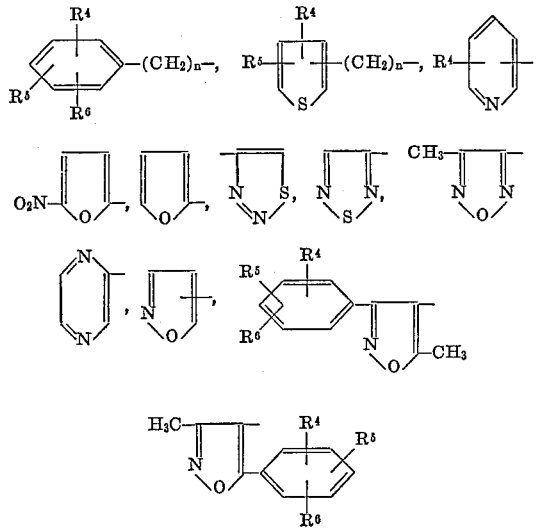

or

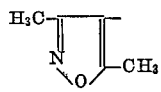

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; and their nontoxic, pharmaceutically acceptable salts.

The pulverized molecular sieves (Linde 4A) employed in the examples are added to make the system as anhydrous as possible. Care should be taken to remove them from the system prior to the addition of the acyl isothiocyanate. Although the products of the various examples are produced in the absence of the use of the molecular sieves, better yields appear to be obtained when they are used.

The α-aminopenicillanic acids used as starting materials in the present invention are made by various methods known to the art, the most preferred of which is embodied in U.S. Patent No. 3,140,282 which employs the condensation of an acid chloride hydrochloride with 6-aminopenicillanic acid to produce an α-aminoarylmethylpenicillin as illustrated below:

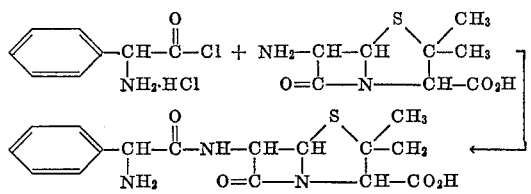

In the treatment of bacterial infections in man, the compounds of this invention are administered topically, orally and parenterally in accordance with conventional procedures for antibiotic administration in an amount of from about 5 to 125 mg./kg./day and preferably in the range of 15 to 50 mg./kg./day for Pseudomonas infections in divided dosages, e.g., three or four times a day. They are administered in dosage units containing, for example, 125, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The acyl isothiocyanates used as starting materials in the present invention are made by various methods known to the art, such as are disclosed by Naito et al., The Journal of Antibiotics, (Tokyo) Series A, 18, 145–157 (1965) and the references cited therein and in Org. Synth. Coll. Vol. III, 735 and J. Org. Chem. 29, 2261–5 (1964) and Berichte 91, 1660–4 (1958).

Illustrative examples of the preparation of penicillins of the present invention follow. In the title of each example the moiety

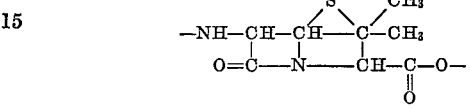

is represented simply by "—APA—."

These examples are given in illustration of, but not in limitation of, the present invention. All temperatures are in degrees centigrade. "Skellysolve B" is a petroleum ether fraction of B.P. 60–68° C. consisting essentially of n-hexane.

DESCRIPTION OF THE PREFERRED EMBODIMENTS

Example 1

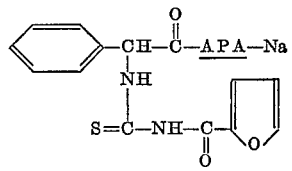

Sodium 6-(D-α-[3-(2-furoyl)thioureido]phenylacetamido)penicillanate (A) 2-furoyl isothiocyanate.—2-furoyl chloride (65.3 g.) was added dropwise to a solution of ammonium thiocyanate in 350 ml. of acetone during 10 minutes while the mixture was heated to reflux. The mixture was stirred at reflux for five minutes longer. The ammonium chloride was removed by filtration. The solvent was removed from the filtrate at reduced pressure and the residue vacuum distilled; yield 31.7 g., B.P. 92–92.5° at 4.5 mm.

(B) Reaction with ampicillin.—A mixture of 15.0 g. of ampicillin trihydrate, 7.7 ml. of triethylamine, 30 g. of powdered molecular sieves (Linde 4A) and 250 ml. of methylene chloride was stirred for 3 hours at room temperature. The molecular sieves were removed by filtration. 2-furoyl isothiocyanate (6.1 g.) was added and the mixture stirred for one hour at room temperature. Water (300 ml.) was added to the reaction mixture and the methylene chloride distilled off at reduced pressure. The aqueous residue was layered with ethyl acetate and acidified with 42% phosphoric acid. Two more extractions were made with ethyl acetate. The combined ethyl acetate extracts were washed twice with water and then extracted three times with a solution of 3.1 g. of sodium bicarbonate in 300 ml. of water. The combined bicarbonate extracts were washed twice with ethyl acetate, layered with ethyl acetate and acidified with 42% phosphoric acid. One more extraction with ethyl acetate was made. The combined ethyl acetate extracts containing the penicillin free acid were washed twice with water, dried with sodium sulfate, and treated with an equivalent amount of sodium 2-ethylhexanoate in 1-butanol (50%). The solid obtained after concentrating and treating the residue with anhydrous ether, was collected by filtration, dried, slurried with ether, collected by filtration and dried in vacuo at 60° for three hours; yield 14.8 g. of sodium 6-(D-α-[3-(2 - furoyl)thioureido]phenylacetamido)penicillanate, M.P. 180–185° dec. The infrared and nuclear magnetic resonance spectra were consistent for sodium 6-(D-α-[3-(2-furoyl)thioureido]phenylacetamido)penicillanate.

The Minimum Inhibitory Concentration (M.I.C.) of this product in mcg./ml. versus a strain of *Pseudomonas aeruginosa* was determined by overnight incubation at 37° C. in Nutrient Broth by serial two-fold tube dilution and found to be 32 mcg./ml.; in the same experiment the M.I.C. for sodium ampicillin was found to be 125 mcg./ml.

Example 2

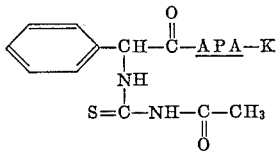

Potassium 6-[D-α-(3-acetylthioureido)phenylacetamido]-penicillanate.—Triethylamine (11.8 ml., 0.084 mole) was added to a suspension of ampicillin trihydrate in 190 ml. of methylene chloride. After stirring for 10 minutes, 30 g. of powdered molecular sieves (Linde 4A) were added and the mixture stirred for three hours at room temperature. The molecular sieves were removed by filtration, an additional 40 ml. of methylene chloride being used to wash the filter cake. To the filtrate containing ampicillin triethylammonium salt was added 5.9 g. (0.0583 mole) of acetyl isothiocyanate (Aldrich) and the solution stirred for two hours at room temperature in an apparatus protected from atmospheric moisture. The reaction mixture was extracted three times with water. The combined aqueous extracts were washed three times with ethyl acetate. The aqueous phase was acidified with 42% phosphoric acid and extracted with three portions of ethyl acetate. The combined ethyl acetate extracts were washed three times with water, dried (anhydrous sodium sulfate), filtered, and concentrated somewhat to remove water as the azeotrope with ethyl acetate. The concentrate was treated with 20 ml. (0.056 mole) of potassium 2-ethyl-hexanoate in 1-butanol causing an oil to separate. The solvent was decanted and the residue was triturated with ethyl acetate, acetone, and ethyl acetate giving a filterable amorphous solid. After filtering, washing with ethyl acetate, and drying in vacuo over phosphorus pentoxide the product weighed 19.3 g. The product, potassium 6-[D-α-(3-acetylthioureido)phenylacetamido]-penicillanate, was dried additionally for 3 hours in vacuo at 65° to remove residual solvent. The infrared and nuclear magnetic resonance spectra were consistent with potassium 6-[D-α-(3-acetylthioureido)phenylacetamido]penicillanate.

*Analysis.*—Calcd. for $C_{19}H_{21}N_4O_5S_2K$: C, 46.70%; H, 4.33%; N, 11.47%. Found: C, 46.75%; H, 4.42%; N, 11.35%.

The Minimum Inhibitory Concentration (M.I.C.) of this product in mcg./ml. versus a strain of *Pseudomonas aeruginosa* was determined by overnight incubation at 37° C. in Nutrient Broth by serial two-fold tube dilution and found to be 63 mcg./ml.; in the same experiment the M.I.C. for sodium ampicillin was found to be 125 mcg./ml.

Example 3

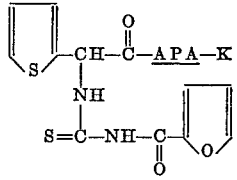

Potassium 6-{D-α-[3-(2-furoyl)thioureido]-2-thienylacetamido}penicillanate is produced by replacing the ampicillin of Example 1 with an equal weight of D-α-amino-2-thenylpenicillin in the procedure of that example.

Example 4

The 2-furoyl isothiocyanate of each of Examples 1 and 3 is replaced by an equimolar weight of the aroyl isothiocyanate prepared from the corresponding aroyl chloride of the following table:

| Acid Chloride | Illustrative Sources |
| --- | --- |
| thiazole-COCl | Acid, acid chloride, amide: Looker, Wilson, J. Heterocyclic Chem. 2 (4), 348 (1965). Acid, acid chloride, ethyl ester: Hurd, Mori, J. Am. Chem. Soc. 77, 5362 (1955). |
| thiadiazole-COCl | Acid, ethyl ester, amide: U.S. 3,060,187. |
| dimethyloxazole-COCl | Acid, ethyl ester: Beil. 27, 317 Amide: C.A. 58: 3409. Kochetkov, Sokolov, Luboshnikova, Zh. Obshch. Khim. 32, 1778-85 (1962). |
| isoxazole-COCl | Quilico, Panizzi, Bazz, Chim. Ital. 72, 458 (1942). Quilico, Stagno d'Alcontres, Gazz. Chim. Ital. 79, 654 (1949) Mina, Rateb, Soliman, J. Chem. Soc. 1962. 4234. |
| pyridine-COCl | Acid: commercially available. |
| methyloxadiazole-COCl | Amide, acid: Beil. 27, 707. Acid chloride: readily prepared by known methods. |
| phenylisoxazole-COCl | Acid, acid chloride: Doyle and Nayler, U.S. 2,996,501 and references cited therein. |
| methylisoxazole-phenyl-COCl | Acid, acid chloride: Doyle and Nayler, U.S. 2,996,501 and references cited therein. | to produce, respectively, the compounds of the formulae

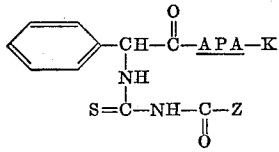

and

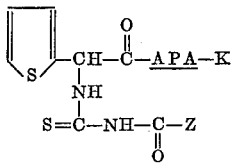

wherein Z is

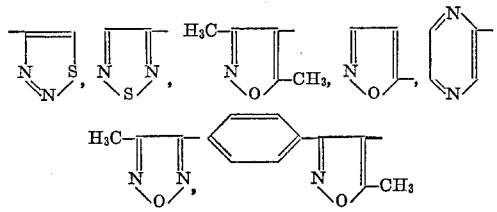

or

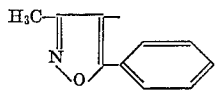

Example 5

The acetyl isothiocyanate of Example 1 is replaced by an equimolar weight of the acyl isothiocyanate of the formula

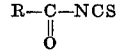

wherein R is dichloromethyl, trichloromethyl, n-propyl, isopropyl, n-butyl, isobutyl, sec.-butyl, t-butyl, n-pentyl, cyclobutyl, cyclopentyl, cyclohexyl and cycloheptyl, respectively, to produce, respectively, the corresponding compounds of the formula

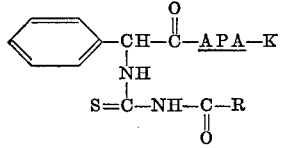

Example 6

The 2-furoyl isothiocyanate of each of Examples 1 and 3 is replaced by an equimolar weight of the substituted benzoyl isothiocyanate of the formula

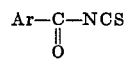

wherein Ar is o-chlorophenyl, m-bromophenyl, p-chlorophenyl, p-methoxyphenyl, p-nitrophenyl and 2,6-dimethoxyphenyl, respectively, to produce, respectively, the corresponding compounds of the formulae

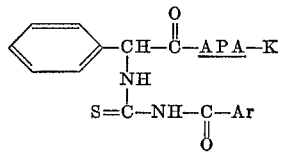

and

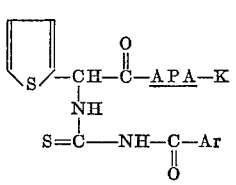

I claim:
1. The compounds of the formula

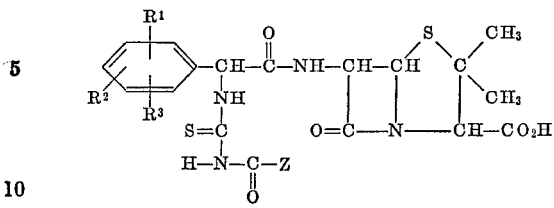

and

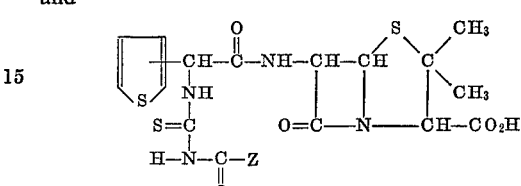

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl,

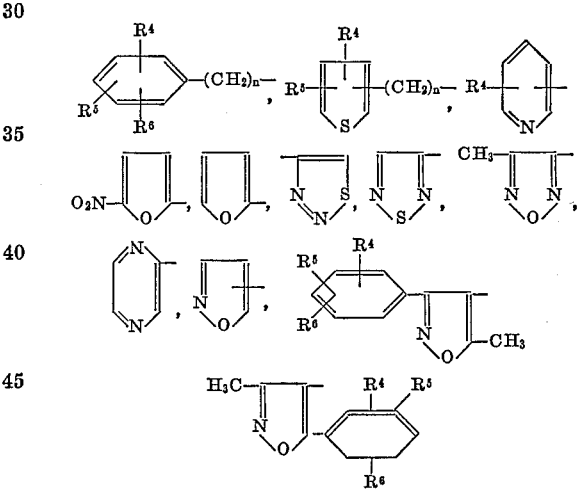

or

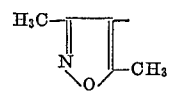

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; and their nontoxic, pharmaceutically acceptable salts.

2. The compounds of claim 1 having the D(-) configuration.

3. The compounds of claim 2 wherein $R^1$, $R^2$ and $R^3$ are each hydrogen, hydroxy or amino.

4. The compounds of claim 2 wherein $R^1$, $R^2$ and $R^3$ are each hydrogen.

5. The compounds of claim 2 wherein $R^1$, $R^2$, $R^3$ and, when present, $R^4$, $R^5$ and $R^6$ are each hydrogen.

6. The compounds of claim 2 wherein $R^1$, $R^2$ and $R^3$ are each hydrogen, hydroxy or amino and Z is (lower)alkyl, chloromethyl, dichloromethyl, trichloromethyl or (lower)alkenyl.

7. The compounds of claim 2 wherein $R^1$, $R^2$ and $R^3$ are each hydrogen and Z is (lower)alkyl.

8. The compounds of claim 2 wherein $R^1$, $R^2$, $R^3$ and, when present, $R^4$, $R^5$ and $R^6$ are each hydrogen, $n$ is zero and Z is one of the specified aromatic radicals.

9. The compounds of claim 2 wherein $R^1$, $R^2$ and $R^3$ are each hydrogen, hydroxy or amino and Z is

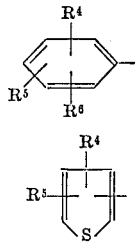

or

10. The compounds of claim 2 wherein $R^1$, $R^2$ and $R^3$ are each hydrogen and Z is phenyl, 2-thienyl, 3-thienyl, 2-furyl or 5-nitro-2-furyl.

11. The compound of claim 1 known as 6-[D-α-(3-benzoylthioureido)phenylacetamido]penicillanic acid and its nontoxic pharmaceutically acceptable salts.

12. The compound of claim 1 known as 6-{D-α-[3-(2'-furoyl)thioureido]phenylacetamido}penicillanic acid and its nontoxic, pharmaceutically acceptable salts.

13. The compound of claim 1 known as 6-{D-α-[3-(2'-thenoyl)thioureido]phenylacetamido}penicillanic acid and its nontoxic, pharmaceutically acceptable salts.

14. The compound of claim 1 known as 6-{D-α-[3-(3'-thenoyl)thioureido]phenylacetamido}penicillanic acid and its nontoxic, pharmaceutically acceptable salts.

15. The compound of claim 1 known as 6-{D-α-[3-(5'-nitro-2'-furoyl)thioureido]phenylacetamido}penicillanic acid and its nontoxic, pharmaceutically acceptable salts.

16. The compound of claim 1 known as 6-[D-α-(3-benzoylthioureido)-2-thienylacetamido]penicillanic acid and its nontoxic, pharmaceutically acceptable salts.

17. The compound of claim 1 known as 6-{D-α-[3-(2'-furoyl)thioureido]-2-thienylacetamido}penicillanic acid and its nontoxic, pharmaceutically acceptable salts.

18. The compound of claim 1 known as 6-{D-α-[3-(2'-thenoyl)thioureido]-2-thienylacetamido}penicillanic acid and its nontoxic, pharmaceutically acceptable salts.

19. The compound of claim 1 known as 6-{D-α-[3-(3'-thenoyl)thioureido]-2-thienylacetamido}penicillanic acid and its nontoxic, pharmaceutically acceptable salts.

20. The compound of claim 1 known as 6-{D-α-[3-(5'-nitro-2'-furoyl)thioureido]-2-thienylacetamido}penicillanic acid and its nontoxic, pharmaceutically acceptable salts.

21. The compound of claim 1 known as 6-[D-α-(3-benzoylthioureido)-3-thienylacetamido]penicillanic acid and its nontoxic, pharmaceutically acceptable salts.

22. The compound of claim 1 known as 6-{D-α-[3-(2'-furoyl)thioureido]-3-thienylacetamido}penicillanic acid and its nontoxic, pharmaceutically acceptable salts.

23. The compound of claim 1 known as 6-{D-α-[3-(2'-thenoyl)thioureido]-3-thienylacetamido}penicillanic acid and its nontoxic, pharmaceutically acceptable salts.

24. The compound of claim 1 known as 6-{D-α-[3-(3'-thenoyl)thioureido]-3-thienylacetamido}penicillanic acid and its nontoxic, pharmaceutically acceptable salts.

25. The compound of claim 1 known as 6-{D-α-[3-(5'-nitro-2'-furoyl)thioureido]-3-thienylacetamido}penicillanic acid and its nontoxic, pharmaceutically acceptable salts.

26. 6-{D-α-[3-(2'-furoyl)thioureido]phenylacetamido}-penicillanic acid.

27. 6-{D-α-[3-(2'-furoyl)thioureido]-2-thienylacetamido}-penicillanic acid.

28. Sodium 6-{D-α-[3-(2'-furoyl)thioureido]phenylacetamido}-pencillanate.

29. Sodium 6-{D-α-[3-(2'-furoyl)thioureido]-2-thienylacetamido}-penicillanate.

30. Potassium 6-{D-α-[3-(2'-furoyl)thioureido]phenylacetamido}-penicillanate.

31. Potassium 6-{D-α-[3-(2'-furoyl)thioureido]-2-thienylacetamido}-penicillanate.

References Cited

UNITED STATES PATENTS 3,308,023   3/1967   Russell _____ 260—239.1

NICHOLAS S. RIZZO, Primary Examiner

U.S. Cl. X.R.

260—999